United States Patent
Burtea et al.

(10) Patent No.: US 7,851,727 B2
(45) Date of Patent: *Dec. 14, 2010

(54) METHOD OF CONTROLLING AN OVEN WITH HYBRID HEATING SOURCES

(75) Inventors: Constantin Burtea, Lindenhurst, IL (US); Sanda Burtea, legal representative, Lindenhurst, IL (US); Frank Anthony Agnello, South Elgin, IL (US); Don Van Erden, Wildwood, IL (US)

(73) Assignee: Prince Castle LLC, Carol Stream, IL (US)

( * ) Notice: Subject to any disclaimer, the term of this patent is extended or adjusted under 35 U.S.C. 154(b) by 222 days.

This patent is subject to a terminal disclaimer.

(21) Appl. No.: 11/749,284

(22) Filed: May 16, 2007

(65) Prior Publication Data

US 2008/0283041 A1 Nov. 20, 2008

(51) Int. Cl.
*A21B 1/06* (2006.01)
*A21B 1/48* (2006.01)
*F27B 9/06* (2006.01)
*F27B 9/36* (2006.01)
*F27B 9/40* (2006.01)
*F24C 3/04* (2006.01)
*F23N 5/00* (2006.01)

(52) U.S. Cl. .................. 219/411; 219/388; 99/331; 99/443 C; 126/92 AC; 431/329

(58) Field of Classification Search ................ 431/329
See application file for complete search history.

(56) References Cited

U.S. PATENT DOCUMENTS

| | | | |
|---|---|---|---|
| 392,162 A | 10/1888 | McDowell et al. | |
| 3,008,513 A | 11/1961 | Holden | |
| 3,084,736 A | 4/1963 | Mentel et al. | |
| 3,129,749 A | 4/1964 | Honger | |
| 3,199,573 A * | 8/1965 | Fiynn | 431/329 |
| 3,852,025 A * | 12/1974 | Placek | 431/329 |
| 4,273,950 A * | 6/1981 | Chitre | 136/255 |
| 4,286,509 A | 9/1981 | Miller et al. | |
| 4,530,276 A | 7/1985 | Miller | |
| 4,557,203 A * | 12/1985 | Mainord | 110/344 |
| 4,927,355 A * | 5/1990 | Haire et al. | 431/329 |
| 4,936,286 A * | 6/1990 | Baker | 126/41 R |
| 5,154,160 A * | 10/1992 | Burtea et al. | 126/21 A |

(Continued)

FOREIGN PATENT DOCUMENTS

DE 195 11 683 A1 11/1995

OTHER PUBLICATIONS

Office action mailed Jan. 22, 2009, in U.S. Appl. No. 11/692,465.

(Continued)

*Primary Examiner*—Joseph M Pelham
(74) *Attorney, Agent, or Firm*—Joseph P. Krause; Kelly & Krause, L.P.

(57) ABSTRACT

Cooking food in a hybrid conveyor with both electric and gas-fired infrared heaters. The heat output from the gas fired infrared heater is controlled by cycling or pulsing the gas supply to one or more burners that emit infrared heat by heating a nichrome screen wire. The electric power supplied to electrically powered heaters is also controlled.

10 Claims, 8 Drawing Sheets

U.S. PATENT DOCUMENTS

| | | | |
|---|---|---|---|
| 5,174,744 A | 12/1992 | Singh | |
| 5,240,411 A | 8/1993 | Abalos | |
| 5,520,536 A * | 5/1996 | Rodgers et al. | 431/329 |
| 5,571,009 A | 11/1996 | Stalhane et al. | |
| 5,960,704 A | 10/1999 | March et al. | |
| 5,989,013 A | 11/1999 | Gray | |
| 6,192,789 B1 | 2/2001 | Agcaoili et al. | |
| 6,262,396 B1 * | 7/2001 | Witt et al. | 219/411 |
| 6,330,791 B1 | 12/2001 | Kendall et al. | |
| 6,659,765 B1 | 12/2003 | Sen-Yu | |
| 6,896,512 B2 | 5/2005 | Rattner et al. | |
| 7,038,172 B1 * | 5/2006 | Stuck | 219/388 |
| 7,297,903 B1 | 11/2007 | March et al. | |
| 2002/0132205 A1 | 9/2002 | Gore et al. | |
| 2002/0146658 A1 * | 10/2002 | Ibrahim et al. | 432/20 |
| 2003/0015518 A1 * | 1/2003 | Baker et al. | 219/486 |
| 2004/0170936 A1 | 9/2004 | Weclas et al. | |
| 2006/0003279 A1 | 1/2006 | Best | |
| 2007/0084457 A1 | 4/2007 | Wiedemann | |

OTHER PUBLICATIONS

Final Office Action dated Oct. 16, 2009 U.S. Appl. No. 11/692,424, filed Mar. 28, 2007.

Non-final Office Action dated Jun. 22, 2009 U.S. Appl. No. 11/739,177, filed Apr. 24, 2007.

* cited by examiner

METHOD OF CONTROLLING AN OVEN WITH HYBRID HEATING SOURCES

BACKGROUND

This invention relates to conveyor ovens. More particularly, this invention relates to a method of cooking foods in a conveyor oven using infrared energy from both electric heaters and from gas-fired infrared heaters. In other words, this invention relates to a method of controlling a hybrid oven.

Heat transfer occurs in at least one of three ways: conduction; convection and radiation. Conduction requires direct physical contact between two objects, such as the direct physical contact that occurs between a frying pan and a food being fried. Convection relies on heat transfer via a liquid or gas. In a conventional oven, heated air molecules bump into other molecules and transfer some of their energy into a food being baked. Infrared heat, is different. It heats by transferring electromagnetic energy. It does not rely on any intermediary to conduct heat because it works directly on molecules in its path.

FIG. 1 depicts the relationship between IR radiation emitted from a surface as a function of wavelength at various surface temperatures. Surfaces temperatures above about 2000 degrees C. will emit relatively short wavelength IR that is in the visible spectrum. Short wavelength IR is known to penetrate materials more deeply than long wavelength IR. At surface temperatures below 900 degrees C., the emitted IR is of a much longer wavelength, less "intense" and less penetrating.

Since all heat transfer involves some loss or inefficiency, radiant cooking is more energy efficient because less energy is lost heating a conductor, whether the heat conductor is a solid material, such as a frying pan, or the air enclosed in a conventional oven. Cooking with infrared heat is therefore faster and more energy efficient than either conduction or convention.

SUMMARY

There is provided a method of controlling a hybrid oven, which is considered herein to be an oven that cooks using both gas and electric energy. The hybrid oven uses at least one gas-fired heater with wire mesh burner plates comprised of substantially parallel, spaced-apart wire mesh burner plates, the spacing of which provides a fuel/air mixture space above, which is a screen that is heated by the combustion of a fuel gas. Fuel gas combustion heats a burner plate screen to a temperature at which it emits infrared energy.

Infrared heat control is accomplished in part by rapidly cycling the fuel gas on and off. Infrared heat control is also accomplished by adjusting the electric energy provided to electrically-powered quartz heaters.

Cycling the gas supply on and off causes the temperature of the burner plate screen to vary between two different temperatures. The high temperature is the temperature achieved just when the gas is shut off. The low temperature is the temperature that is reached just before the gas is turned back on and re-ignited.

Cycling the gas supply therefore causes the emitted IR to vary over a range that is determined by the two temperatures that are determined by the on time and off time of the gas supply. Different wavelengths of IR will penetrate food differently. Varying gas on/off cycle time varies the oven's cooking effect.

DETAILED DESCRIPTION

Figure 2:
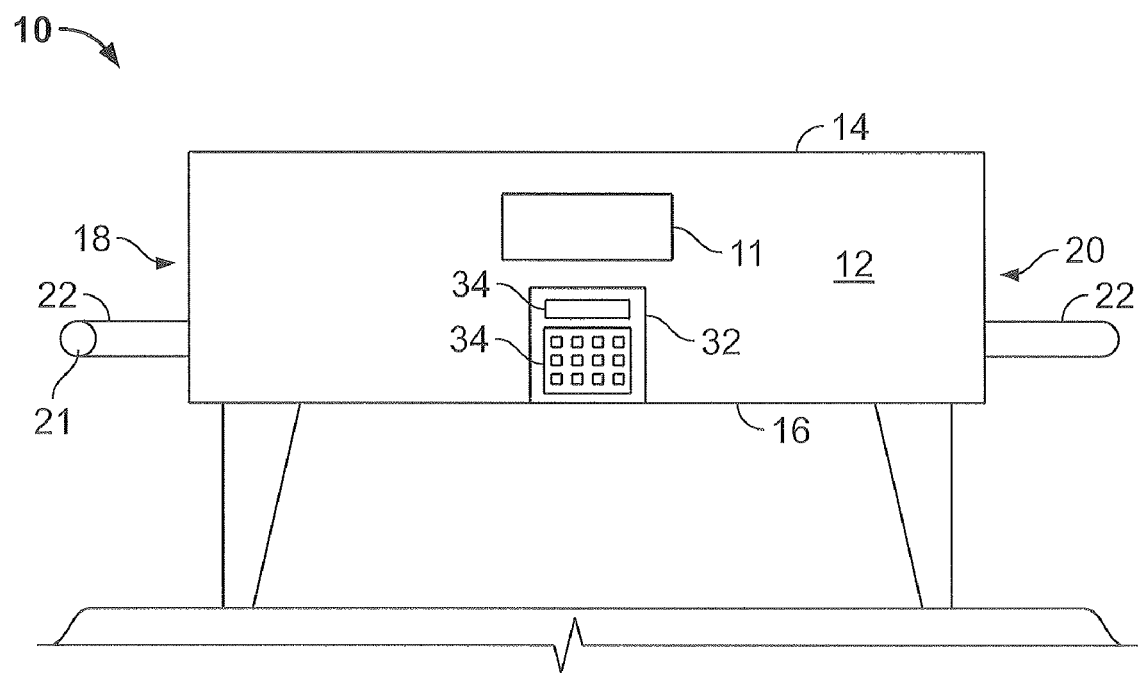
FIG. 2 is a front view of a hybrid oven.

FIG. 2 is a front view of a conveyor oven 10 with both electric and gas infrared heating sources. The oven 10 is referred to herein as a hybrid oven because it uses two different energy sources.

The hybrid oven 10 is defined by housing within which is a cavity 12. The cavity 12, has a top 14, a bottom 16 a first opening 18 on the left-hand side and a second opening 20 on the right-hand side. The oven 10 is also provided with one or more viewing windows 11 made from a translucent, heat-tolerant and IR-suppressing glass in order to allow an operator to continuously and safely monitor the cooking process within the oven 10.

The cavity 12 encloses heaters that direct infrared heat toward a conveyor 22 that carries foods from the first opening 18 to the second opening 20, or vice versa. Because the heaters are hot and because the cavity 12 entraps air within it, the heaters within the cavity 12 also generate convective heat as well.

FIG. 2 also depicts a controller 32 having a keypad and display unit 34. The keypad and display unit 34 allow an operator to enter commands to the controller, which effectuates cooking control. Cooking control is achieved in part by adjusting the speed of the motor 21 driving the conveyor 22, which is controlled by the controller 32. Cooking control is also achieved by controlling the heat provided by electrically powered infrared heaters within the cavity and by controlling the infrared heat from gas-fired infrared heaters within the cavity 12. Note that neither the gas nor the electric heaters are shown in FIG. 2.

Figure 3:
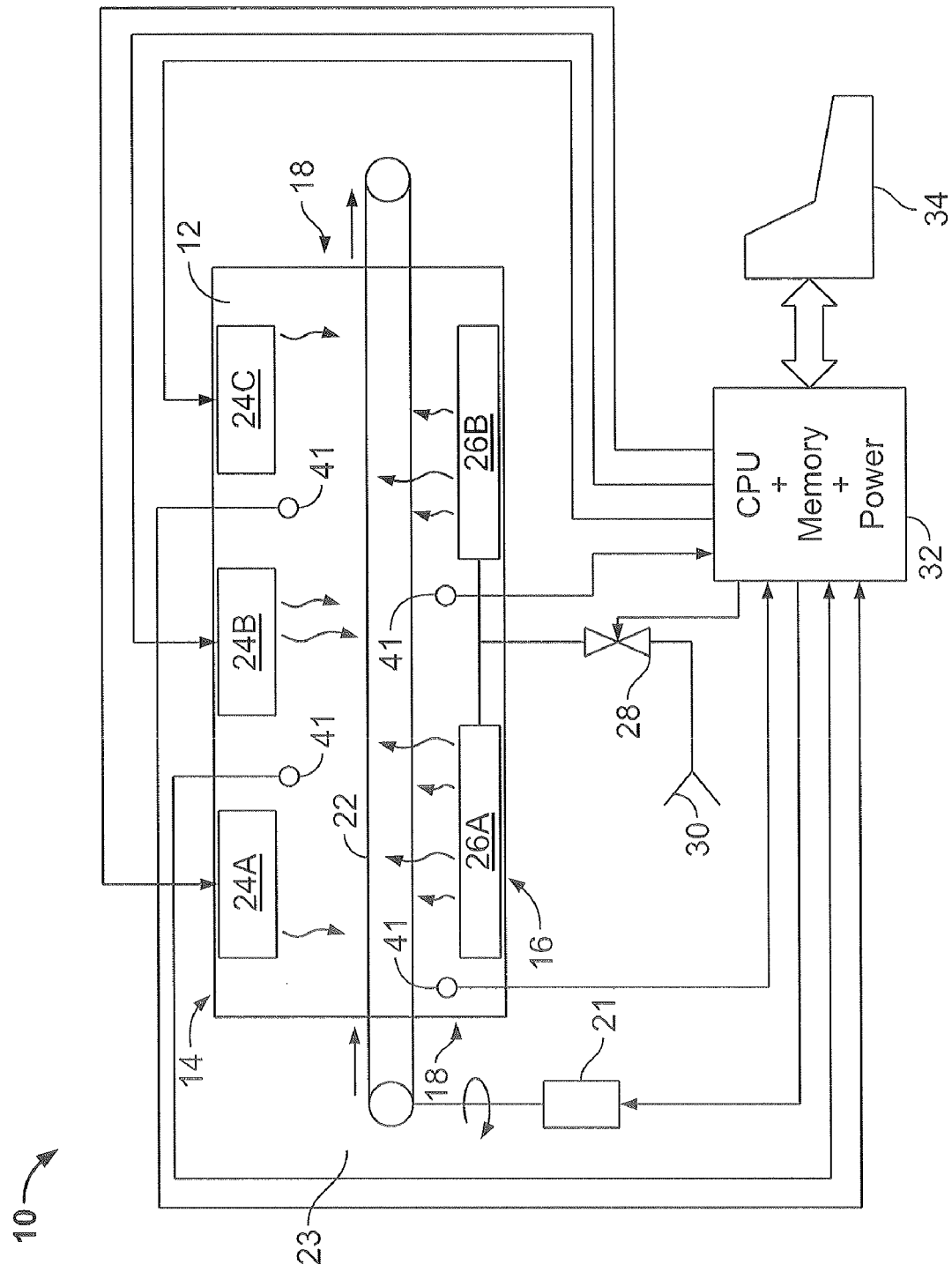
FIG. 3 is a schematic view of a hybrid oven.

FIG. 3 shows a schematic diagram of the oven 10 depicted in FIG. 2. The heating sources 24 and 26 face the conveyor 22 as well as each other. When a food item enters the cavity 12 on the conveyor 22 through the first opening 16, the food is subjected to infrared heat from both the top 14 and the bottom 16 of the cavity 12. The three top-mounted heaters 24A, 24B and 24C are electrically powered infrared heaters. Alternate embodiments of the oven 10 employ less than three and more than three top-mounted heaters 24, each of which can be controlled to emit various different wavelength IR, based on how much heat might be needed to heat or cook a food item on the conveyor 22, as well as how much output heat is required from each heater.

Two gas-fired, infrared-generating heaters 26A and 26B are shown, both of which are located immediately below the conveyor 22 and facing upwardly from the oven bottom 16. Heaters 26A and 26B generate infrared heat from the cyclical combustion of a fuel gas (natural or liquid propane) and direct the generated infrared heat upwardly toward the conveyor 22. The gas-fired heaters 26 necessarily generate convective heat, however, most of the effective heat they produce is infrared.

Infrared energy from the first electrically powered burner 24A heats food from above the food item, whereas the gas-fired burner 26A emits infrared energy to heat the food from below the food item. Thus, IR is provided to both the top and the bottom surfaces of food items on the conveyor 22.

As the conveyor 22 moves from left to right, the conveyor 22 carries the food item under a second electrically powered infrared heater 24B. A second infrared-emitting gas-fired burner 26B located below the conveyor 22 also directs additional infrared heat upwardly toward the conveyor 22. As with the first electric heater 24A and the first gas-fired heater 26A, both of the second heaters, 24B and 26B emit infrared heat. The upper heater 24B emits IR generated from electric resistive heating whereas the lower heater 26B emits IR generated by combustion.

A third electrically powered infrared heater 24C at the top 14 of the cavity 12 also provides downwardly directed infrared heat near the second opening 18 of the oven 10. Third, fourth, fifth or more gas-fired burners could also be provided based on cooking requirements that include, the type of food being heated or cooked, its initial temperature, its desired output temperature and conveyor speed or the through-put required of the oven.

Figure 7:
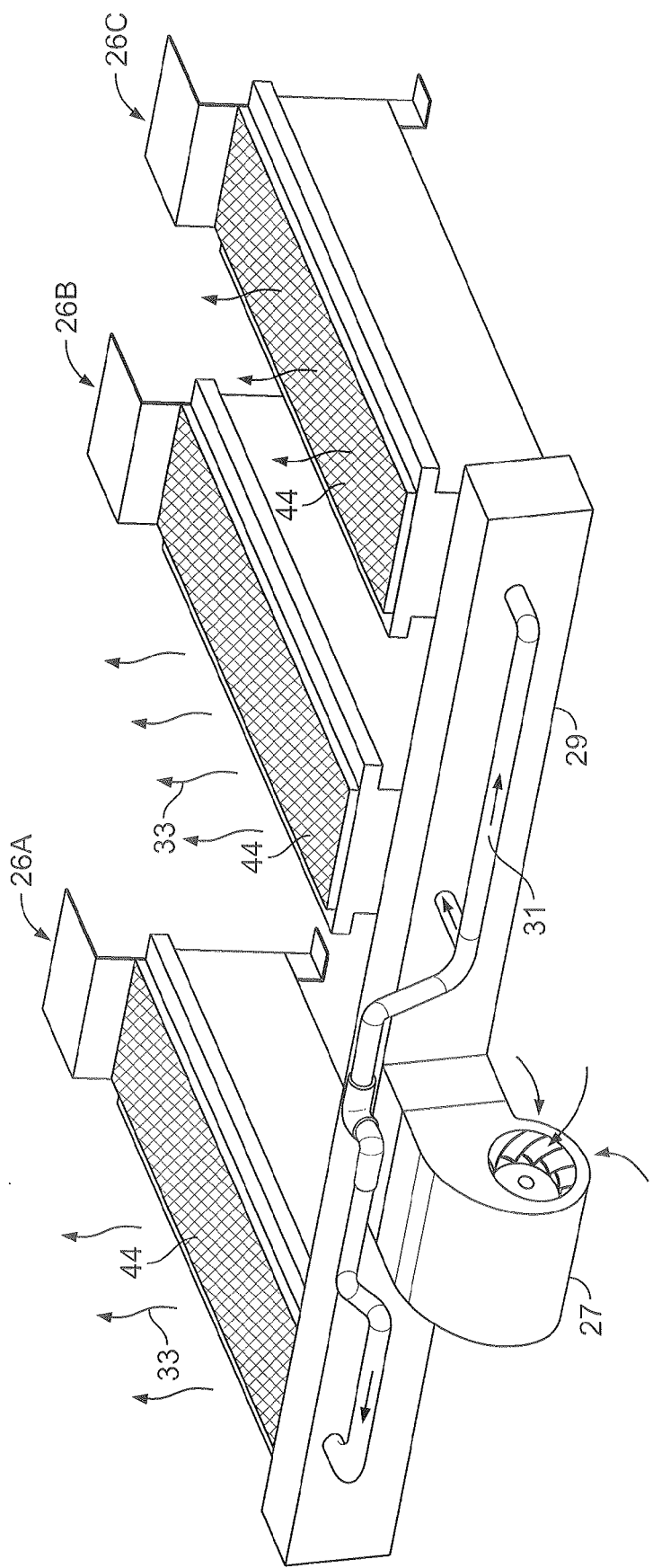
FIG. 7 shows three infrared-emitting gas burners operated side-by-side.
Figure 8:
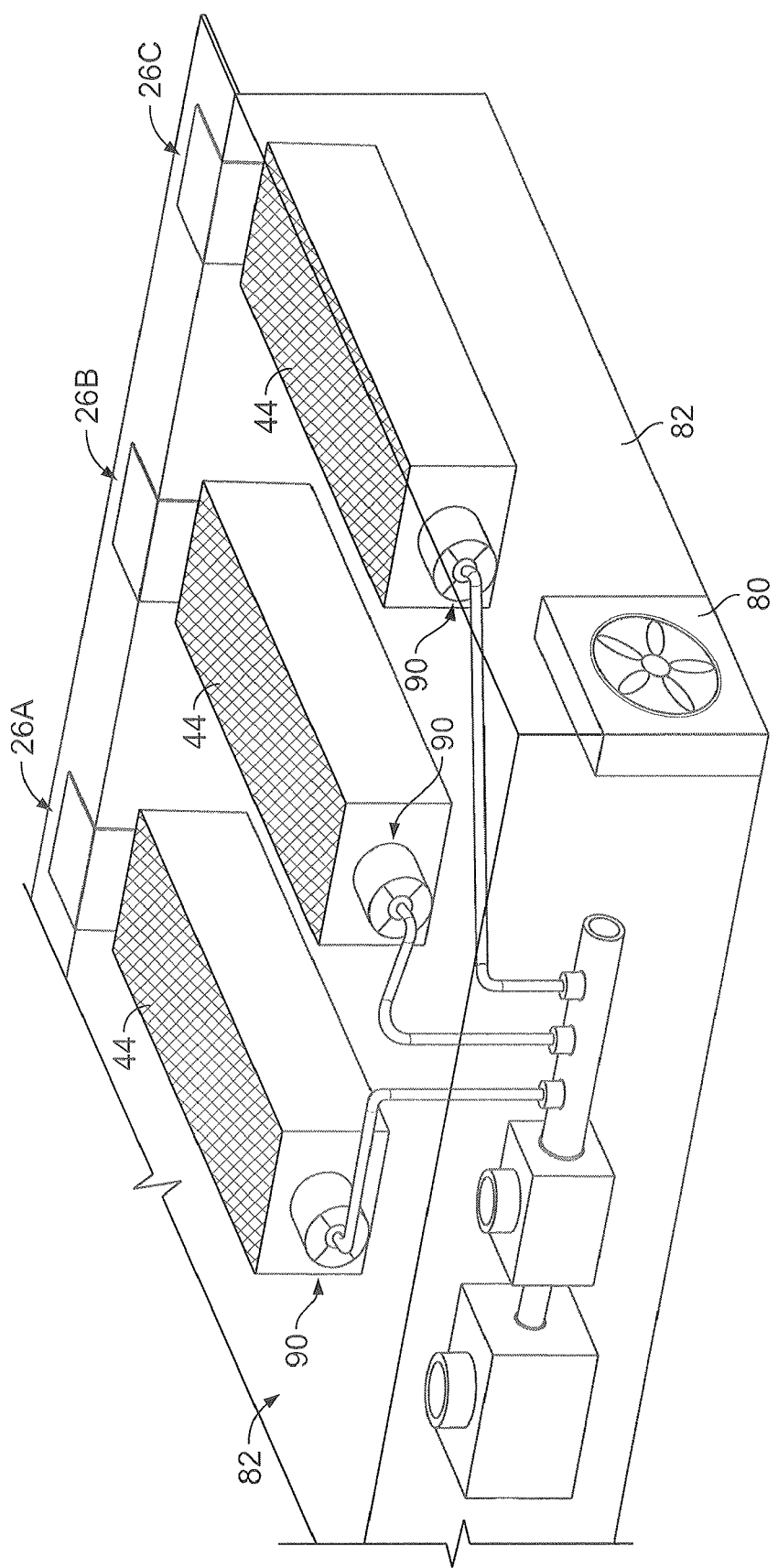
FIG. 8 shows an alternate embodiment of three infrared-emitting burners operated side-by-side.

In a preferred embodiment, the hybrid oven 10 is provided with one or more electrically powered, top-mounted IR heaters 24 and several bottom mounted gas-fired heaters 26 as shown in FIGS. 3, 7 and 8. In an alternate embodiment, however, the top-mounted IR heaters are also gas fired so that the top-mounted heaters 24 and the bottom mounted heaters 26 are both gas-fired.

Figure 4:
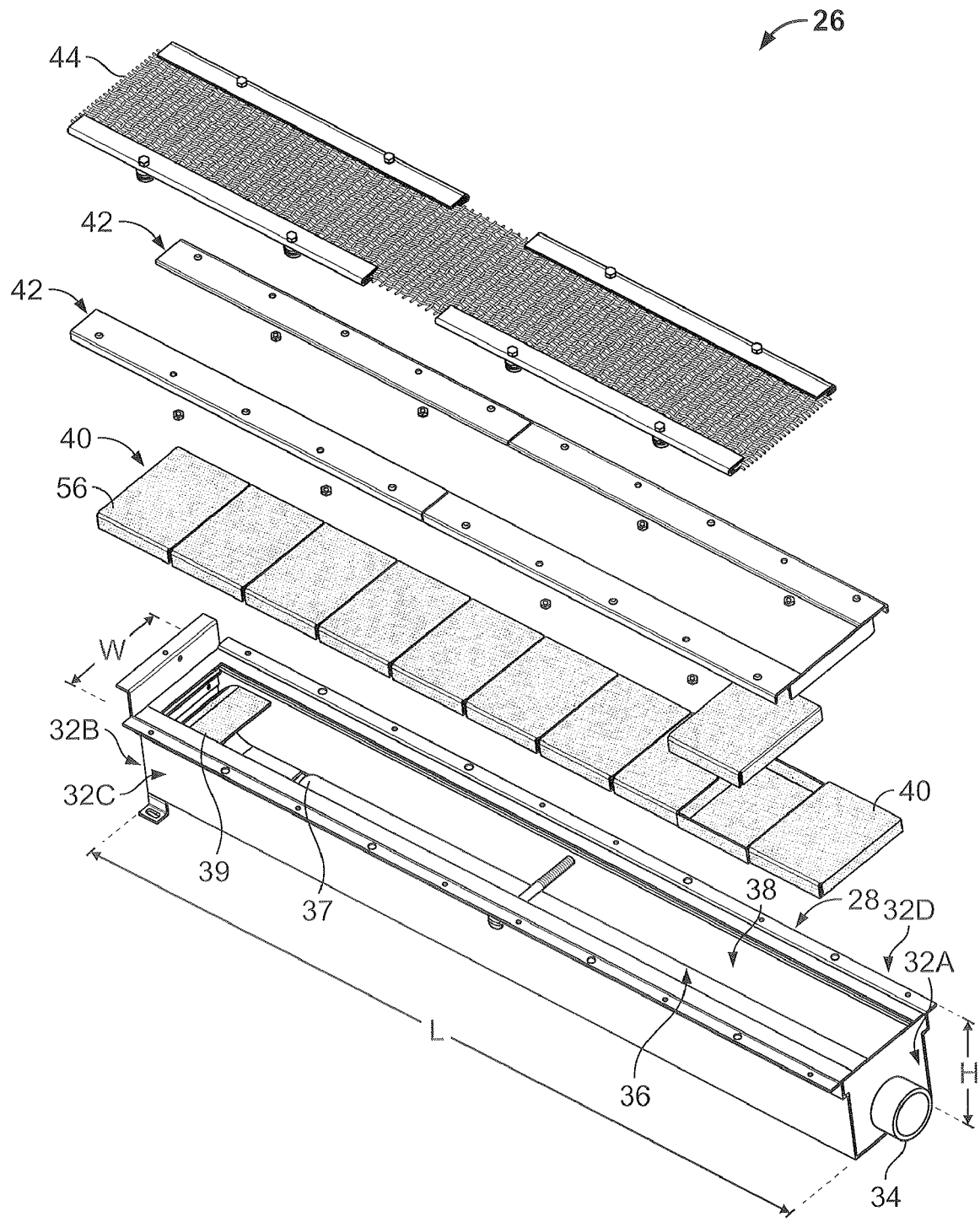
FIG. 4 is an exploded view of a gas burner used in the hybrid oven.

FIG. 4 shows an exploded view of a gas burner 26 used in the oven 10 of FIG. 2 and FIG. 3. The structure shown in FIG. 4 is also described in the applicants' co-pending patent application for an INFRARED EMITTING GAS BURNER, filed on Mar. 28, 2007, the U.S. application serial number of which is Ser. No. 11/692,465. The description of the gas burner in the co-pending application is incorporated herein by reference in its entirety.

As stated in the co-pending application, the gas burner of FIG. 4 is constructed from a fuel distribution chamber, which is identified in this application by reference numeral 28. The fuel distribution chamber 28 is in the shape of a cuboid or rectangular parallelepiped 28 having a bottom (not shown) and four sides 32A, 32B, 32C and 32D and an open top 38, through which a gas/fuel mixture flows from the interior of the chamber 28.

The fuel distribution chamber 28 has a length L, a width W, and a height H, defined by the depth of the fuel distribution chamber 28. A gas and/or gas/combustion air mixture is introduced into the distribution chamber 28 through a fuel inlet pipe 36, one end of which 34, extends through one side 32A of the chamber 28. The fuel inlet pipe 36 extends through most of the length L, of the fuel distribution chamber 28.

At the second or distal end 37 of the fuel distribution pipe 36, the fuel and/or fuel/air mixture leaves the pipe 36 and strikes a U-shaped gas diverter vane 39, which is sized, shaped and arranged to redirect gas leaving the fuel inlet pipe 36, back toward the first side 32A of the distribution chamber 12.

The open top 38 of the fuel distribution chamber 28 is covered by several, separate individual wire mesh burner plates 40, which are described in a co-pending patent application entitled, WIRE MESH BURNER PLATE FOR A GAS OVEN BURNER, filed on Mar. 28, 2007 and having application Ser. No. 11/692,424, the entire disclosure which is incorporated herein by reference.

One or more wire mash burner plates 40 cover the open top 38 of the fuel distribution chamber 28. Fuel and air that leaves the second opening 37 of the pipe 36 fills the distribution chamber 28 and eventually flows upward (relative to the bottom of the fuel distribution chamber 28) through the wire mash burner plates 40 that extend over the open top 38 of the distribution chamber 12.

Fuel and air flowing upwardly through the burner plates 40 is ignited by a pilot flame (not shown), which is lit by electric igniter controlled by the controller 32 in order to cause the fuel and air mixture leaving the top of the burner plates 40 to ignite and thereafter combust. A gasket 42 around the burner plates 40 prevents fuel and combustion air from leaking from the sides of the burner plates 40 thereby insuring that the fuel/air mixture passes through the burner plates 40.

The fuel that passed through the burner plates 40 combusts above the plates 40 but below the wire burner screen 44, which is preferably a low mass, heat tolerant material that quickly reaches an R-emitting temperature by the combustion of the fuel air mixture. The burner plate screen 44 is preferably made from nichrome wire.

Once the screen 44 reaches a desired infrared emission, the fuel supply 30 is shut off by the controller 32. After the fuel gas is shut off, the hot wire burner screen 44 will emit IR and will continue to emit IR energy as it cools. At a later time, which is determined by controller software, the gas supply 30 is restored, the fuel/air mixture re-ignited to re-heat the wire burner screen 44.

As described in the applicants' co-pending application for a wire mesh burner screen, fuel combustion takes place above the burner plates 32 but below the burner plate screen 44. The space between the screen 44 and the burner plates 40 defines a combustion space. The height or spacing of the wire screen 44 above the burner plates 40 is therefore chosen to provide a space large enough to allow the fuel to fully combust below the burner plate screen 44 to thereby maximize the transfer into the screen 44.

Figure 5:
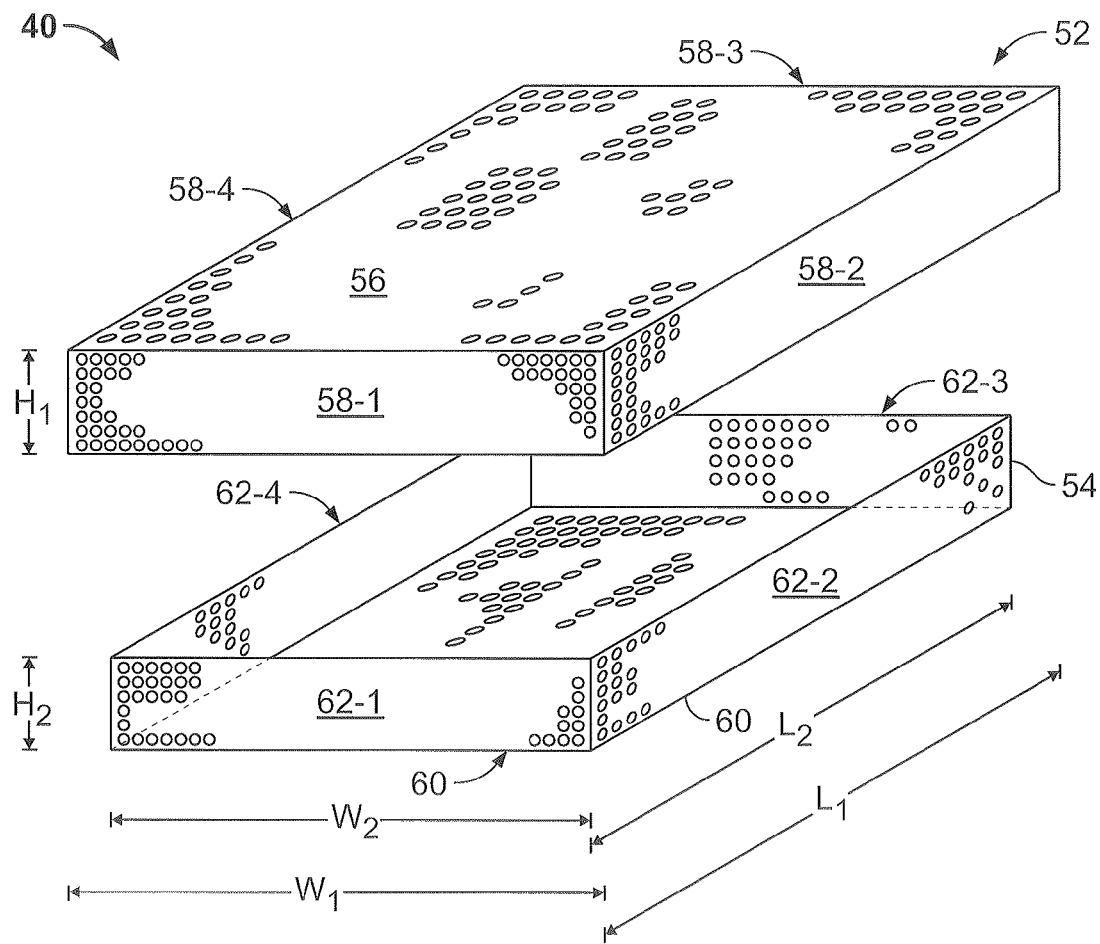
FIG. 5 shows the structure of a wire mesh burner plate used in the gas burners shown in FIG. 4.

The wire mesh burner plates 40 are fully described in the applicants co-pending patent application for a wire mesh burner plate for a gas oven burner, however, FIG. 5 shows a perspective view of one embodiment of a wire mash burner plate 40 constructed from open top parallelepipeds 52 and 54. A top or first open-faced parallelepiped 52 is formed from a piece of wire mesh preferably made 29 gauge perforated stainless steel sheet or other heavy gauge and heat-tolerant mesh or mesh-equivalent.

The first parallelepiped 52 has a first major face 56 of mesh material and four mesh sides 58-1, 58-2, 58-3 and 58-4. The sides 58 are formed by bending, folding, welding or stamping in order to form the sides 58, to be orthogonal, or substantially orthogonal, to the first major face 56.

A bottom or second open-faced parallelepiped 54 also as a first major face 60 and four sides 62-1, 62-2, 62-3 in 62-4. As with the first open-faced parallelepiped 52, the second open faced parallelepiped that 54 as one of its major face is opened or missing.

Both of the parallelepipeds 52 and 54 have length, width and depth dimensions as shown, however the width and the length of the bottom or second open-faced parallelepiped 54 shown in FIG. 5 is sufficiently smaller or less than the width and length of the top or first open-faced parallelepiped 52 in order to allow the second or bottom parallelepiped 54 to fit snugly within or "nest" within the first parallelepiped 52 as described in co-pending application Ser. No. 11/692,424.

Figure 6:
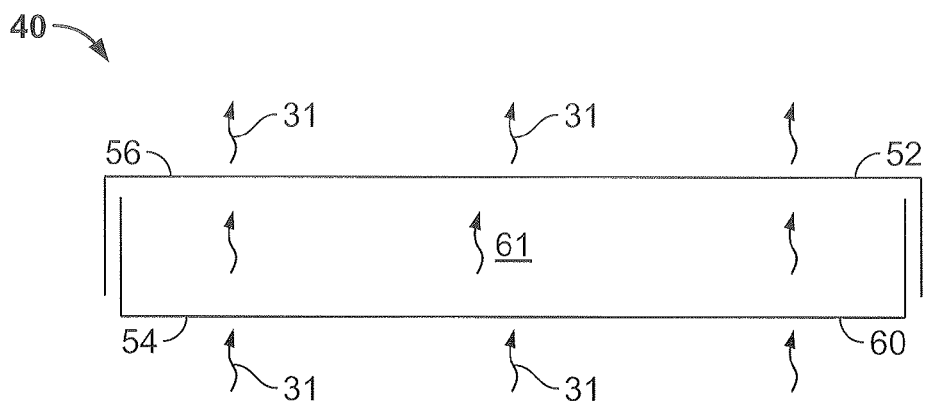
FIG. 6 is cross-sectional view of the wire mesh burner plate shown in FIG. 5.

FIG. 6 is a cross-section of the nested open-faced parallelepipeds 52 and 54 shown in FIG. 5 but with the size differences exaggerated to show how one parallelepiped 54 fits within the other parallelepiped 52. Note that each of the parallelepipeds 52 and 54 have an open or missing major face. The bottom or second open-top parallelepiped 54 is located almost entirely within the volume enclosed by the faces and sides of the first open-top parallelepiped 52. Nesting one open-top parallelepiped in the other open-top parallelepiped defines an open volume 60, approximately ½" in the preferred embodiment, wherein fuel and combustion air mixes as it flows from the bottom major face 58 through the top major face 56 above which the fuel/air mixture combusts. The fuel and air mix within the open volume 61 because of turbulence created by a pressure drop experienced after the gases flow through the holes in one of the major faces 56 or 58.

As described in the co-pending application entitled WIRE MESH BURNER PLATE FOR A GAS OVEN BURNER, several burner plates 40 can be hooked together by inverting every other burner plate 40 such that one side of a first downwardly-oriented large parallelepiped hangs over one side of a second, adjacent, upwardly-oriented parallelepiped. By orienting the large parallelepipeds so that every other parallelepiped has its large half facing downward, the sides of the larger open-top parallelepipeds can be engaged to each other to form an extended wire mesh burner plate. Several burner plates can be hooked together in a checker board pattern, as described in the co-pending application for a wire mesh burner plate, with every other wire mesh burner plate being inverted relative to its adjacent neighbors to form a very wide as well as a very long wire mesh burner plate.

Referring to FIG. 4, as the fuel/air mixture passes through the burner plates 40, the fuel/air mixture is ignited and combusts in a space between the burner plate 40 and a wire mash burner screen 44. Fuel combustion heats the wire screen 44 until it emits infrared energy. As set forth more fully below, the intensity of IR emitted from the wire screen 44 is a function of its wavelength, which is a function of the screen's temperature. After the gas is shut off, IR energy continues to be emitted from the screen 44 as it cools, with the emitted-IR wavelength gradually but continuously increasing as the screen 44 temperature drops. Infrared heat intensity is therefore controllable by cycling the gas supply 30, on and off, i.e., by opening and closing the electrically operated fuel valve 28 under software control of the controller 32.

FIG. 7 shows three gas-fired burners 26A, 26B and 26C arranged side-by-side, for use in the hybrid oven 10 depicted in FIG. 2. Combustion air is forced into each of the burners 26 from a blower 27, the output of which is routed to the burners 26 through a combustion air manifold 29. Each burner inlet 34 also receives fuel gas from a fuel gas manifold 31. When the fuel/air mixture is ignited, the burners emit infrared heat 33 from the heated burner screens 44.

Figure 9:
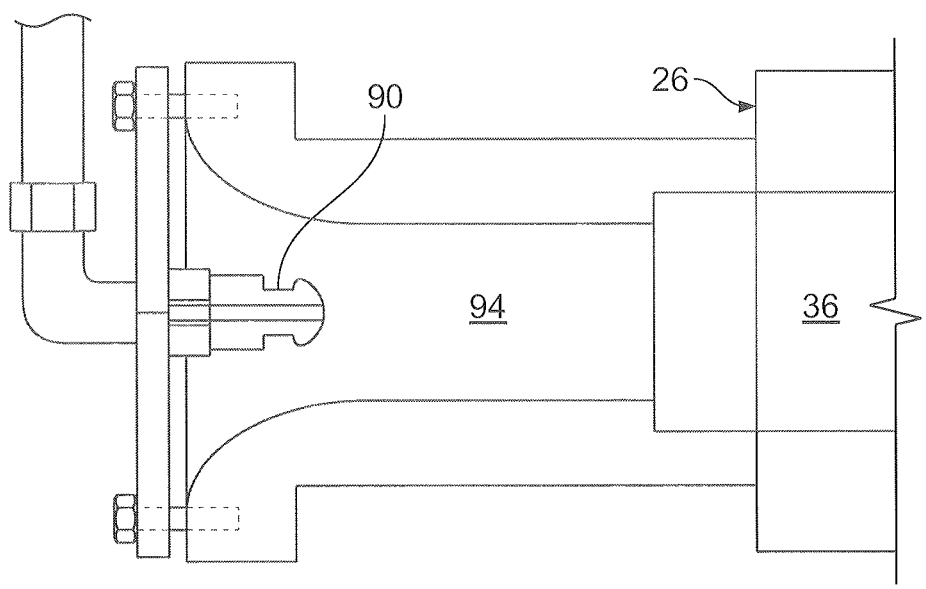
FIG. 9 shows a cross-section of the burner nozzle used in the burners depicted in FIG. 8.

FIG. 8 depicts an alternate embodiment of three, gas-fired burners 26A, 26B and 26C, arranged side-by-side for use in the hybrid oven 10 depicted in FIG. 2. In FIG. 8, however, combustion air is indirectly forced into each of the burners 26 from a blower 80, which forces combustion air into an interior cavity 82 that is sealed to form an air plenum. Since the plenum is at a slightly elevated pressure, air is forced or urged into a nozzle 90 placed into each of the infrared-emitting burners described above and in co-pending application Ser. No. 11/692,465. As shown in FIG. 9, fuel gas supplied to each nozzle 90 flows into a venturi 94. The fuel gas and combustion air flows through from the venturi 94 into the fuel inlet pipe of the burners 26.

Cooking control is achieved in part by monitoring the oven's internal temperature using several temperature sensors 41, preferably embodied as thermistors, and adjusting the energy output from the various burners 24 and 26. The CPU maintains the oven's internal temperature by turning the burners 24 and 26 on and off in response to readings obtained from the sensors 41.

As shown in FIG. 3, thermistor sensors 41 are positioned through-out the oven 10, in order to obtain an average of the oven's internal temperature. Each sensor 41 is connected into the CPU 32 so that the temperature of each sensor 41 can be read by the CPU. While the preferred embodiment of the oven uses multiple sensors 41, oven temperature control can be realized by reading a single sensor 41 to determine whether the oven's temperature is below an empirically-determined value and if it is, turn one or more burners on in order to raise the oven's temperature.

When a relatively cold item is placed onto the conveyor 22 and carried into the oven's interior, the item absorbs heat from the oven's interior causing the oven temperature to drop. In response, the CPU turns on the heaters 24 and 26 to raise the oven's temperature by the addition of infrared heat.

In one embodiment, the individual ones of the top-mounted electric IR heaters and the bottom-mounted gas-fired IR heaters are controlled by the CPU 32 in unison such that they all go on and off at substantially the same time, gas and electric heaters alike, to effectuate oven temperature control. In an alternate embodiment, individual ones of the top-mounted IR heaters and individual ones of the bottom-mounted gas-fired IR heaters are independently actuated and individually modulated to effectuate temperature control.

The infrared heat intensity emitted from the electrically powered burners 24 is controlled by adjusting the electrical energy supplied to electric heating elements (by the controller 32) using various prior art methods and devices. Those of ordinary skill in the art will recognize that the electric infrared heaters can be controlled by varying an A.C. duty cycle as well as varying the magnitude of a D.C. or A.C. voltage delivered to a heating element. The power delivered to an electric element can be readily controlled using an SCR or a TRIAC for example.

Infrared heat intensity emitted from the gas-fired burners 26 is controlled by cycling the gas supply 30 on and off through a two-position, electrically operated gas valve 28, i.e., an electrically operable valve that is either "on" or "off." The gas supply 30 is controlled by opening and closing the electrically operated gas valve 28 coupled between the gas supply 30 and the burners 26. Since the gas supply to the burners 26 is cycled on and off, the burners 26 are referred to herein as "pulsed" burners.

When the gas supply 30 is on, the gas' combustion heats the wire screen 44 to some temperature at which the screen 44 emits IR. After the screen 44 is heated for some empirically-determined length of time, the gas is shut off. Because the screen 44 is hot when the gas is shut off, it immediately begins to emit IR, but it also immediately starts to cool. As the screen 44 wire cools, it continues to emit IR but the wavelength of the emitted IR lengthens as the screen's temperature drops. Since the "on" time of the gas supply determines the screen's maximum temperature and, since the "off" time determines the screen's minimum temperature, the gas supply on time vs. off time therefore determines an average intensity/wavelength of the IR emitted from screen 44. It follows that cycling the gas supply 30 on and off will vary the wavelength of the IR emitted. Decreasing the gas supply 30 "off" time relative to the "on" time will keep the burner on longer, thereby increasing the screen's average temperature, which will shorten or decrease the emitted IR wavelength, which results in an increased IR intensity. Increasing the off time relative to the on time will reduce the screen's average temperature, thereby decreasing the gas supply 30 "off" time relative to the "on" time.

Figure 10:
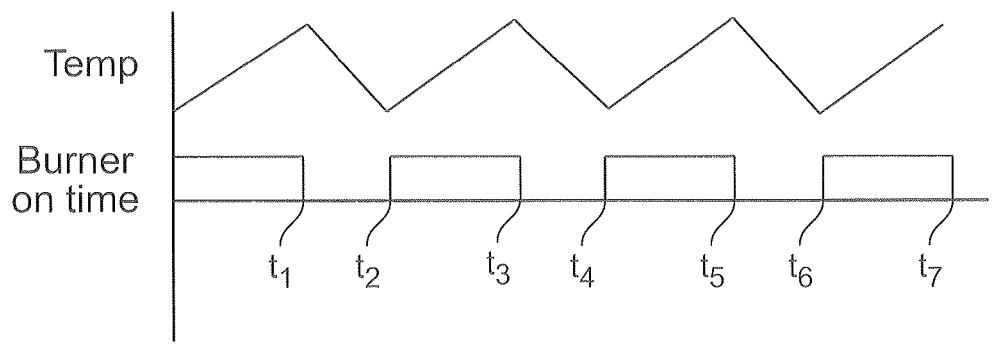
FIG. 10 is a graph depicting an example of the gas supply "on" time for a burner shown in FIG. 3 and showing the corresponding output temperature of the gas burner shown in FIG. 3.

FIG. 10 depicts a graph of an example of the fuel valve "on time" on the horizontal axis. The screen temperature is plotted on the vertical axis. Between the start time and t1, the controller 32 turns on the gas valve 28 and ignites the fuel/air mixture. The temperature of the wire screen 44 rises as long as the gas supply is on. At time t1 the gas valve 28 is shut off.

Between time t1 and t2, the wire screen 44 emits IR as its temperature decreases. As its temperature decreases, the emitted IR wavelength increases. At time t2, the gas valve 28 is re-opened and combustion reestablished, which causes the temperature of the screen 44 to increase. At time t3, the gas valve is closed, the wire screen 44 continues to emit IR as it cools until the gas and combustion is restored at time t4. As the screen 44 temperature increases and decreases, the emitted IR wavelength decreases and increases respectively.

Figure 11:
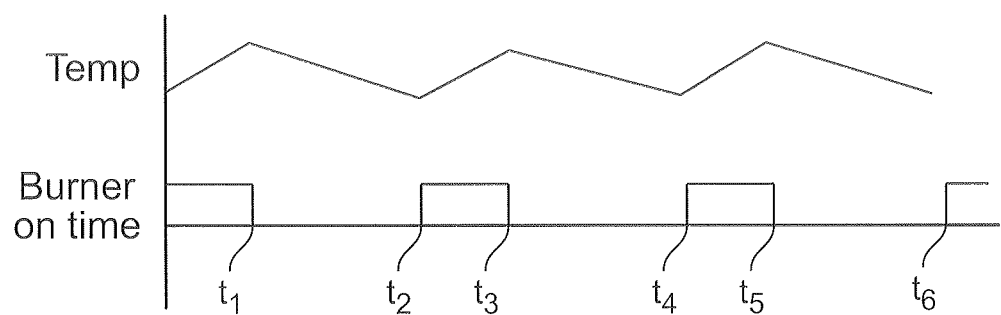
FIG. 11 is a second graph of the "on" time for the burner of FIG. 3 and the corresponding output temperature of the gas burner shown in FIG. 3.

In FIG. 11, the burner 26 on time and the screen 44 temperature are also plotted together as in FIG. 10, however, in FIG. 11, the duty cycle or "on time" of the burner 26 is less than the burner on time depicted in FIG. 10. As a result, the screen 44 temperature does not go as high as it does in FIG. 10 nor does it emit as much short-wavelength IR.

Figure 1:
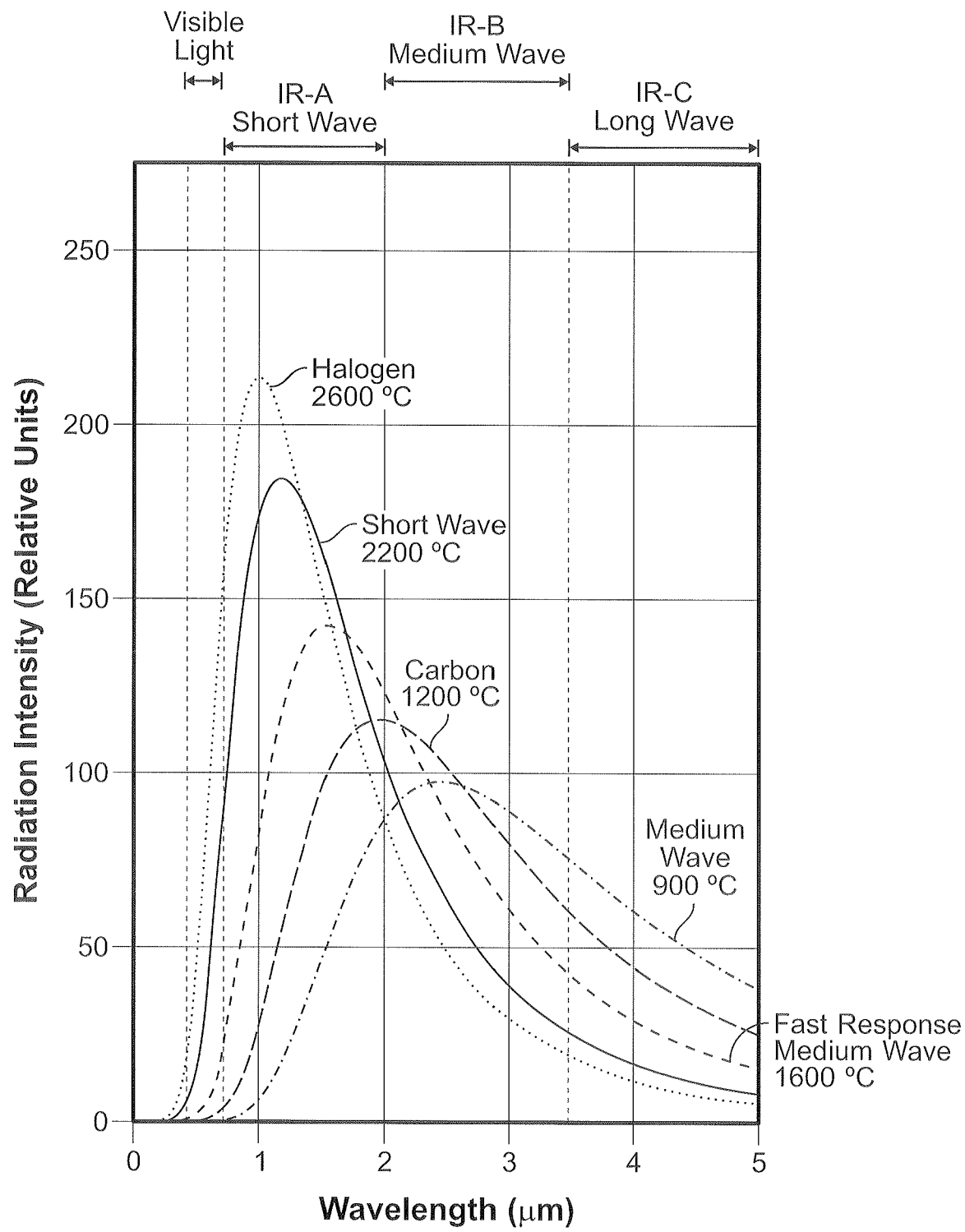
FIG. 1 is a graph of infrared energy emission as a function of IR wavelength, for a body at various temperatures

As can be seen in FIG. 1, heating the wire screen 44 to a temperature of 2000 degrees or higher and shutting off the gas will allow the screen wire 44 to initially emit the more deeply penetrating short wavelength IR. As the screen 44 cools, however, it will continue to emit IR. As the screen 44 cools, the emitted IR wavelength will continuously lengthen, becoming increasingly less intense albeit more surface-browning IR. Cycling the screen wire 44 temperature will therefore have the effect of sweeping the food item with an IR energy spectrum. The plots shown in FIGS. 7 and 8 can therefore be considered to depict the relative intensity and frequency of IR emitted from the screen 44 and the burners 26 as a function of time, where the emitted frequency=1/λ and λ=emitted wavelength.

The infrared energy emitted from the screen wire 44 will have an average wavelength determined by the maximum and minimum temperatures. The average output wavelength can also be increased or raised by decreasing the "on" time relative to the "off" time. Thus, the average infrared output energy level of the burner screen 44 shown in FIG. 11 is less than that shown in FIG. 10. By controlling the on time and off time of the gas valve 28, the average infrared energy emitted from the burners 26 can be controlled.

The duration of the gas burner "on" time and "off" time is determined empirically. If food exiting the oven at a particular conveyor speed is not sufficiently cooked, the controller is re-adjusted to select a longer gas supply on time relative to the gas supply off time. The "on" time of the electric heaters is also extended. If a food exiting the oven is overcooked, the controller is re-adjusted to select a shorter gas supply on time; the "on" time of the electric heaters is also reduced. By way of example, the controller is adjusted to cause the gas supply to be on for forty or fifty seconds and left off for ten to twenty seconds. A second, uncooked food sample is then passed through the oven at the desired conveyor speed and its condition evaluated after passing through the oven. By passing a few uncooked food items through the oven at a particular rate, a gas burner on time vs. off time can be determined.

By iteratively adjusting the gas supply on time and off time for a given conveyor speed, the wavelength and intensity of the IR emitted from the gas-fired burners can be adjusted to achieve virtually any desired cooking result for virtually any desired production rate. By turning the gas supply on and off, (and igniting the gas each time the gas is turned on) the temperature of the wire screen in the gas-fired burner is made to fluctuate repeatedly and periodically, between two different temperatures. At least one of the temperatures should be above the temperature at which infrared heat is emitted from the screen.

In a preferred embodiment the controller 32 cycles the gas supply on and off for and on time that varies between about five seconds and about 60 seconds. The rapid cycling and relatively short on time allows the average infrared output level to be steadied, in other words held relatively constant while providing the advantages of improved efficiency and enhanced lifespan for the wire mash burner plates.

The foregoing description is not intended to and should not be construed to define or limit the invention's scope. The true scope of the invention is defined by the appurtenant claims.

What is claimed is:

1. A method of controlling a hybrid oven having a conveyor on which food items are carried through the oven and further having at least one gas-fired burner and at least one electrically-powered infrared heater, the gas-fired burner having at least one wire-mesh burner plate above which is a wire burner screen, the method comprising:
   pulsing the supply of a gaseous fuel to the gas-fired burner, on and off, and combusting the gaseous fuel while the gaseous fuel is supplied so that the gaseous fuel combusts in a space between the wire mesh burner plate and the wire burner screen, the gas combustion periodically heating the burner screen so that its temperature fluctuates between a first high temperature, such that the wavelength of the maximum emitted infrared at the first high temperature is about 1.0 micrometers, and a second low temperature, such that the wavelength of the maximum emitted infrared at the second low temperature is about 4.5 micrometers; the burner screen emitting infrared energy at both the first high and second low temperatures and at all temperatures there between;
   wherein the on time and the off time are determined empirically, based on a condition of food leaving the oven.

2. The method of claim 1, further including the step of:
   prior to the step of pulsing the gas supply on, measuring the oven's temperature at at least one location within the oven to determine whether the oven temperature is below a first value.

3. The method of claim 1, further including the step of:
   prior to the step of pulsing the gas supply on, measuring the oven's temperature at a plurality of locations within the oven to determine whether the oven temperature is below a first value.

4. The method of claim 1, wherein the step of pulsing the supply of a gaseous fuel on and off, includes empirically varying the on time from about 5 seconds to about 60 seconds.

5. The method of claim 1 further comprised of the steps of:
varying the power to electrically-powered infrared-emitting heaters in said hybrid oven.

6. The method of claim 1, further comprising the step of: varying the speed of the conveyor to provide a production rate of items cooked within the hybrid oven.

7. A method of controlling a hybrid oven having at least one gas-fired burner and at least one electrically-powered infrared heater, the method comprising the steps of:
measuring the oven's temperature at at least one location within the oven to determine whether the oven temperature is below a first value;
supplying a gaseous fuel for a predetermined on time, to a gas burner having a wire-mesh burner plate and a wire burner screen;
igniting the gaseous fuel so that the fuel combusts to heat a wire burner screen, the combustion of said gaseous fuel heating the burner screen during the predetermined on time, to heat the burner screen to a first temperature at which the burner screen emits a maximum infrared energy at a wavelength of about 1.0 micrometers;
after the first period of time has elapsed, cutting off the gaseous fuel for a second, predetermined off time, to allow the burner screen to cool to a second temperature at which the burner screen emits a maximum infrared energy at a wavelength of about 4.5 micrometers;
after the second predetermined off time has elapsed, restoring the gaseous fuel to the wire mesh burner plate and re-establishing the combustion of the gaseous fuel for said predetermined on time;
wherein the on and off times are determined empirically, from a condition of a food product leaving the oven.

8. The method of claim 7, further comprised of the steps of adjusting the power provided to the at least one electrically-powered infrared heater.

9. The method of claim 8, wherein the step of adjusting the power provided to the at least one electrically-powered heater includes the step of maintaining the electrical power at a fixed level.

10. The method of claim 7, further comprising the step of: varying the speed of the conveyor to provide a production rate of items cooked within the hybrid oven.

* * * * *